Jan. 4, 1949.   A. E. FORSSELL   2,458,154
BACKUP LIGHT SWITCH
Filed May 21, 1945
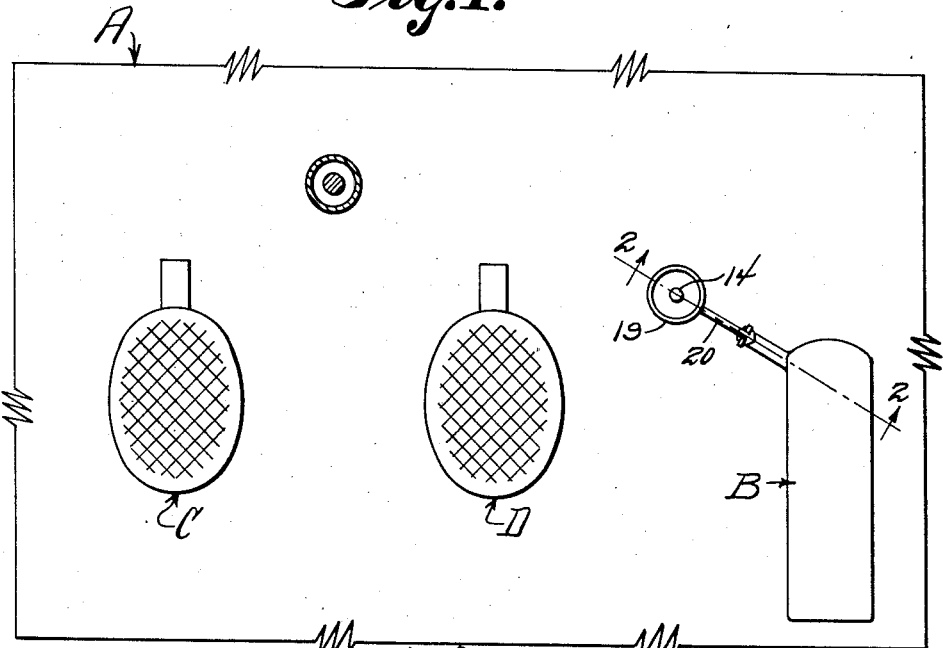
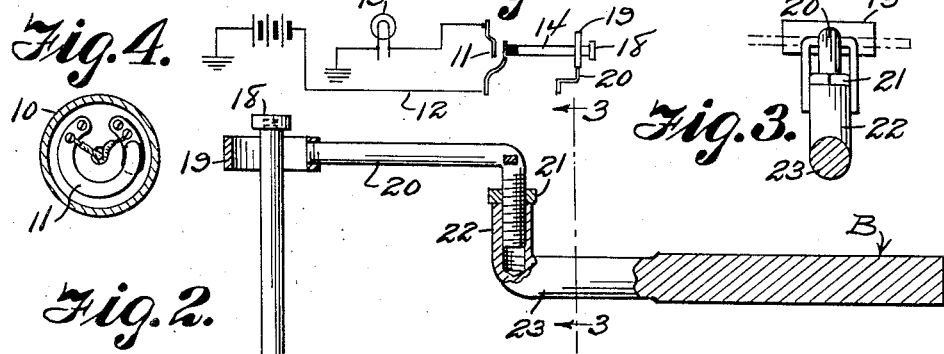
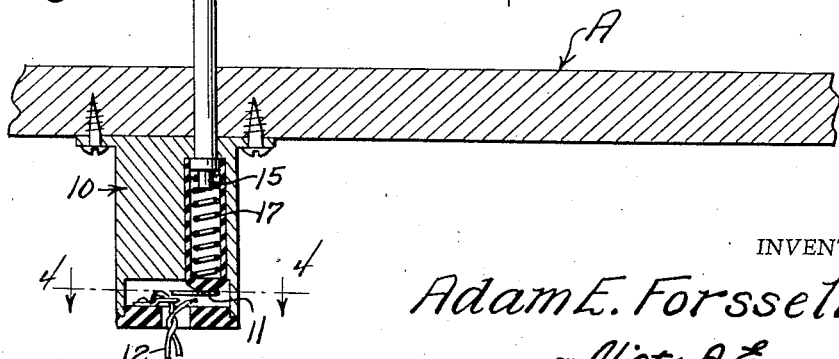
INVENTOR.
Adam E. Forssell
BY Victor J. Evans & Co.
ATTORNEYS

UNITED STATES PATENT OFFICE 2,458,154

BACKUP LIGHT SWITCH

Adam E. Forssell, Chico, Calif.

Application May 21, 1945, Serial No. 595,049

1 Claim. (Cl. 200—59)

The invention relates to an automatic electric light control device, and more especially to an automatically operated cut-off switch device for a backing-up or rear-end light for a motor vehicle.

The primary object of the invention is the provision of a device of this character, wherein it is associated with an accelerator pedal equipment within a motor vehicle, so that on operation of the pedal, when the driving power is in reverse, the backing-up light can be automatically turned on for rear end lighting of the said vehicle, which aids in the backing of the latter, and when the pedal is released from pressure, the said light becomes automatically shut-off, the pedal being also operable independently of the device for normal driving of the vehicle either forwardly or backwardly, and additionally, the light can be turned on when the vehicle is standing still with its power unit inactive, or the gear shift mechanism is in neutral condition.

Another object of the invention is the provision of a device of this character, wherein the turning on and turning off of the rear-end light by hand is entirely eliminated, thereby relieving mental reservation for the turning off of such light after it has been turned on, the device being located next to the pedal, so as to be in convenient position for the simultaneous operation of both, one working being for the turning on of the light and the other working for the automatic turning off of such light when pressure on the pedal is relieved therefrom.

A further object of the invention is the provision of a device of this character, wherein the construction thereof is novel and its assembly with the accelerator pedal unique, it being dust-proof, and accessible for the operation thereof, which is manually controlled under one condition and automatic under another condition.

A still further object of the invention is the provision of a device of this character, which is simple in construction, thoroughly reliable and efficient in its operation, strong, durable, readily and easily adjusted, possessed of few parts, easily set-up, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is a plan view of the device constructed and arranged in accordance with the invention.

Figure 2 is a sectional view taken on the line 2—2 of Figure 1 looking in the direction of the arrows.

Figure 3 is a sectional view taken on the line 3—3 of Figure 2 looking in the direction of the arrows.

Figure 4 is a sectional view taken on the line 4—4 of Figure 2 looking in the direction of the arrows.

Figure 5 is a diagrammatic view of the electrical set up of the device in association with the rear-end or back-up light.

Similar reference characters indicate corresponding parts throughout the several views in the drawing.

Referring to the drawing in detail, A designates generally a portion of the rearwardly sloping floor board within a motor vehicle body, of any ordinary construction, and B denotes the accelerator pedal for regulating the fuel supply to the power unit of such vehicle, as usual; the clutch and brake pedals being indicated at C and D, respectively.

Mounted beneath the floor board A, next to the pedal B, and slightly to the left hand side and forwardly thereof is a suitable insulated switch casing or housing 10 having arranged therein a normally open closable springy bladed switch 11, having an electrical circuit connection 12 with an electric bulb light 13, which is located on the vehicle, not shown, at the rear end thereof for illumination when backing up or reverse driving operation of such vehicle.

Working through a suitable guide clearance in the floor board A is a vertically disposed depressible plunger 14, which has within the casing or housing 10 an insulated spring tensioned engaging head 15 adapted to play on the switch 11 on depressing the plunger for closing such switch and thereby effect the lighting of the light 13. The head 15 is fitted within a way 16 in the casing or housing 10 and the spring 17 therein functions to raise the plunger so that the switch 11 will automatically open the circuit connection 12 and thus light 13 becomes extinguished.

At the uppermost end of the plunger 14 is a foot button 18, while immediately below the normal plane of such button concentric to the plunger is an encircling ring 19, which is carried on the longer portion of an inverted substantially L-shaped bracket arm or bar 20, the shorter portion of the latter being adjustably locked in threaded engagement by a lock nut 21 in an upstanding sleeve extension 22 of a substantially L-shaped branch arm 23 joined with and extending laterally from the left side of the pedal B, in a forwardly angled direction thereto.

It should be seen from Figure 2 of the drawing that by depressing the button 18 at the location of the ring 19, the plunger 14 will be operated for the closing of the switch 11, and thereby turning on the light 13, and simultaneously the pedal B will be depressed. Now, when pressure is relieved from the button 18 the switch 11 will automatically open and the light shuts-off. At the same time, the pedal B returns to normal raised position, thus relieving the power unit from acceleration. The pedal B is susceptible of independent operation when the foot is placed squarely thereon, and not over the button 18, as will be obvious from Figure 2 of the drawings.

The depressing of the button 18 causes the depressing of the pedal B when the foot of the operator is directly over the ring 19. The height of the ring 19 with relation to the plunger 14 can be varied by the adjustment of the arm 20 in its coupling with the arm 23, as will be apparent from Figure 2 of the drawing. Normally, the switch is open and such switch is only closed when the plunger is depressed for this purpose, so that the rear end light is controlled in this manner.

What is claimed is:

In a rear light switch actuator for simultaneously actuating a back-up light and the accelerator pedal of motor vehicles having a floor board with a light switch suspended therefrom and an accelerator pedal spaced from the upper surface thereof, the combination, which comprises, a plunger having a button on the upper end slidably mounted in said floor board and with the lower end in operative engagement with the switch, said accelerator pedal having a horizontally disposed arm extending from one side with an upwardly extending end having a threaded socket therein, a horizontally disposed bar with an open ring at one end freely positioned around the said plunger and having a threaded downwardly extending end threaded in the threaded socket of the arm of the pedal, and a lock nut securing the bar in the socket of the arm.

ADAM E. FORSSELL.

REFERENCES CITED

The following references are of record in the file of this patent:

UNITED STATES PATENTS

| Number | Name | Date |
| --- | --- | --- |
| 1,760,212 | Ruble | May 27, 1930 |